US012669295B2

(12) United States Patent
Liu et al.

(10) Patent No.: US 12,669,295 B2
(45) Date of Patent: Jun. 30, 2026

(54) HEAT EXCHANGE TUBE ASSEMBLY, FABRICATION METHOD THEREOF AND REFRIGERATOR

(71) Applicants: HEFEI HAIER REFRIGERATOR CO., LTD., Hefei City (CN); HAIER SMART HOME CO., LTD., Qingdao City (CN)

(72) Inventors: Zhanzhan Liu, Qingdao City (CN); Peng Li, Qingdao City (CN); Haijuan Wang, Qingdao City (CN)

(73) Assignees: HEFEI HAIER REFRIGERATOR CO., LTD., Hefei City (CN); HAIER SMART HOME CO., LTD., Qingdoa City (CN)

( * ) Notice: Subject to any disclaimer, the term of this patent is extended or adjusted under 35 U.S.C. 154(b) by 504 days.

(21) Appl. No.: 18/026,591

(22) PCT Filed: Sep. 9, 2021

(86) PCT No.: PCT/CN2021/117336
§ 371 (c)(1),
(2) Date: Mar. 15, 2023

(87) PCT Pub. No.: WO2022/057717
PCT Pub. Date: Mar. 24, 2022

(65) Prior Publication Data
US 2023/0341191 A1     Oct. 26, 2023

(30) Foreign Application Priority Data
Sep. 15, 2020    (CN) ......................... 202010967377.X

(51) Int. Cl.
F28D 15/04        (2006.01)
B23P 15/26        (2006.01)

(52) U.S. Cl.
CPC .............. F28D 15/04 (2013.01); B23P 15/26 (2013.01); B23P 2700/09 (2013.01)

(58) Field of Classification Search
CPC ....... F25B 41/40; F16L 59/065; F16L 59/075; F16L 59/021; F16L 59/07; F16L 59/12; F16L 59/123; F16I 53/70; F28D 15/04
See application file for complete search history.

(56) References Cited

U.S. PATENT DOCUMENTS

| 3,360,001 A * | 12/1967 | Anderson | ............. | F16L 39/005 |
| | | | | 285/47 |
| 3,397,720 A * | 8/1968 | Jones | .................... | F16L 59/029 |
| | | | | 220/592.27 |
| 2003/0209025 A1 | 11/2003 | Lee | | |

FOREIGN PATENT DOCUMENTS

| BE | 879272 A * | 2/1980 | .............. F16L 59/12 |
| CN | 203687400 U | 7/2014 | |

(Continued)

OTHER PUBLICATIONS

English translation of CN 205593227U (Year: 2016).*

*Primary Examiner* — Tho V Duong
(74) *Attorney, Agent, or Firm* — MUNCY, GEISSLER, OLDS & LOWE, P.C.

(57)                ABSTRACT

The present invention provides a heat exchange tube assembly, a fabrication method thereof and a refrigerator, wherein the heat exchange tube assembly includes a heat exchange tube group, the heat exchange tube group includes a capillary tube and a gas return tube which come into contact with each other, and the heat exchange tube assembly further includes a vacuum tube with which a periphery of the heat exchange tube group is sleeved; heat transfer paths, such as heat conduction, heat convection, or the like, can be eliminated.

4 Claims, 3 Drawing Sheets

(56)           References Cited

FOREIGN PATENT DOCUMENTS

| CN | 105351684 | A | | 2/2016 | | |
| CN | 105526748 | A | | 4/2016 | | |
| CN | 205593227 | U | | 9/2016 | | |
| CN | 206410382 | U | | 8/2017 | | |
| CN | 107166821 | A | | 9/2017 | | |
| CN | 107387884 | A | * | 11/2017 | ............ | F16L 59/065 |
| CN | 109458775 | A | | 3/2019 | | |
| CN | 210625023 | U | | 5/2020 | | |
| GB | 1422156 | A | * | 1/1976 | ............ | F16L 59/141 |
| GB | 2481253 | A | * | 12/2011 | ............ | F16L 59/065 |
| IT | 1136391 | B | | 8/1986 | | |
| KR | 10-0281810 | B1 | | 10/2001 | | |
| KR | 20060002368 | A | * | 1/2006 | .............. | F16J 15/02 |
| WO | WO-0025054 | A1 | * | 5/2000 | ............ | F16L 59/065 |

* cited by examiner

HEAT EXCHANGE TUBE ASSEMBLY, FABRICATION METHOD THEREOF AND REFRIGERATOR

CROSS REFERENCE TO RELATED APPLICATIONS

The present invention is a 35 U.S.C. § 371 National Phase conversion of International (PCT) Patent Application No. PCT/CN2021/117336, filed on Sep. 9, 2021, which claims benefit of Chinese Application No. 202010967377.X, filed on Sep. 15, 2020, the disclosure of which is incorporated by reference herein. The PCT International Patent Application was filed and published in Chinese.

TECHNICAL FIELD

The present invention relates to the field of refrigerating devices, and in particular, to a heat exchange tube assembly, a fabrication method thereof and a refrigerator having the same.

BACKGROUND

In an existing refrigerator, in order to improve a refrigerating efficiency of a refrigerating system, a capillary tube and a low-pressure gas return tube in the refrigerating system are generally brought into contact to form a heat exchange tube assembly. The gas return tube and the capillary tube generally have two contact arrangements: 1) external contact arrangement: for example, the capillary tube and the gas return tube are welded together side by side, or the capillary tube and the gas return tube are fastened together side by side by aluminum foil, or the capillary tube is wound around a periphery of the gas return tube. 2) Internal accommodation arrangement: the capillary tube is inserted through the gas return tube.

For the external contact arrangement, peripheries of the capillary tube and the gas return tube are generally and additionally sleeved with a soft sleeve to separate the capillary tube and the gas return tube from a heat insulation layer; however, the soft sleeve does not have a heat insulation effect, and heat on the capillary tube and the gas return tube is directly transferred through the heat insulation layer; since the capillary tube and the gas return tube are close to a refrigerating compartment, and temperature differences between temperatures of the capillary tube and the gas return tube and a temperature in the refrigerating compartment are large, a heat load in the refrigerating compartment is large, and an influence on a heat load of the refrigerator is large; meanwhile, in order to completely exchange heat between the capillary tube and the gas return tube, the capillary tube and the gas return tube are required to be long, thus increasing a cost.

For the internal accommodation arrangement, although the capillary tube directly exchanges heat with a cooling medium in the gas return tube, resulting in a good heat exchange effect, since the capillary tube is located in the cooling medium, turbulent flow may be generated in the cooling medium, thus increasing a noise generated when a compressor works.

In view of this, it is necessary to provide a new heat exchange tube assembly, a fabrication method thereof, and a refrigerator having the same, so as to solve the above problems.

SUMMARY

An object of the present invention is to provide a heat exchange tube assembly, a fabrication method thereof and a refrigerator having the same.

In order to achieve the above-mentioned object of the invention, the following technical solution is adopted in the present invention: a heat exchange tube assembly, comprising a heat exchange tube group, the heat exchange tube group comprising a capillary tube and a gas return tube which come into contact with each other, the heat exchange tube assembly further comprises a vacuum tube with which a periphery of the heat exchange tube group is sleeved.

As a further improved technical solution of the present invention, the heat exchange tube assembly further comprising a getter and/or a drying agent provided in the vacuum tube.

As a further improved technical solution of the present invention, the heat exchange tube assembly further comprising a support for fixing the heat exchange tube group in the vacuum tube.

As a further improved technical solution of the present invention, the support comprises a support sleeve with which the periphery of the heat exchange tube group is sleeved and a plurality of support sheets located on a side of the support sleeve facing an inner wall of the vacuum tube.

As a further improved technical solution of the present invention, a section of the support sleeve is circular, and an outer diameter of the support sleeve is less than an inner diameter of the vacuum tube.

As a further improved technical solution of the present invention, at least two supports are provided and distributed in the vacuum tube at intervals along an axial direction of the vacuum tube.

As a further improved technical solution of the present invention, the gas return tube and the capillary tube are arranged side by side.

In order to achieve the above-mentioned object of the invention, the present invention also provides a fabrication method of a heat exchange tube assembly, comprising the following steps:

bringing a capillary tube and a gas return tube into contact with each other to form a heat exchange tube group;

placing the heat exchange tube group in a vacuum tube; and vacuumizing the vacuum tube and closing an opening of the vacuum tube.

As a further improved technical solution of the present invention, between the placing the heat exchange tube group in a vacuum tube and the vacuumizing the vacuum tube, the fabrication method further comprises the following step: placing a getter and/or a drying agent in the vacuum tube.

As a further improved technical solution of the present invention, between the bringing a capillary tube and a gas return tube into contact with each other to form a heat exchange tube group and the placing the heat exchange tube group in a vacuum tube, the fabrication method further comprises the following step: sleeving a periphery of the heat exchange tube group with a support or placing the support in the vacuum tube.

As a further improved technical solution of the present invention, the vacuumizing the vacuum tube and closing an opening of the vacuum tube specifically comprises:

closing the end openings at two ends of the vacuum tube;

connecting a vacuumizing opening for vacuumizing on the vacuum tube to a vacuum pump;

heating the vacuum tube and starting the vacuum pump to
realize a preset vacuum degree; and
closing the vacuumizing opening.

As a further improved technical solution of the present
invention, a heating temperature of the vacuum tube is not
lower than 70° C.; and the preset vacuum degree is 1 pa.

In order to achieve the above-mentioned object of the
invention, the present invention also provides a refrigerator,
comprising the above heat exchange tube assembly; or a
heat exchange tube assembly fabricated using the above
fabrication method of a heat exchange tube assembly.

The present invention has the following beneficial effects:
in the heat exchange tube assembly according to the present
invention, by sleeving the periphery of the heat exchange
tube group with the vacuum tube having a heat preservation
and insulation performance, heat transfer paths, such as heat
conduction, heat convection, or the like, can be eliminated,
and only heat radiation is left; that is, the vacuum tube can
greatly improve a heat insulation effect of the heat exchange
tube assembly, thus reducing an influence of the heat
exchange tube assembly on a temperature in a refrigerating
compartment, and reducing a heat load of the refrigerator;
meanwhile, the heat transfer paths, such as heat conduction,
heat convection, or the like, are eliminated, such that the
capillary tube and the gas return tube can be subjected to
sufficient heat exchange, thereby reducing lengths of the
capillary tube and the gas return tube to achieve a purpose
of saving a cost.

DETAILED DESCRIPTION

Figure 1:
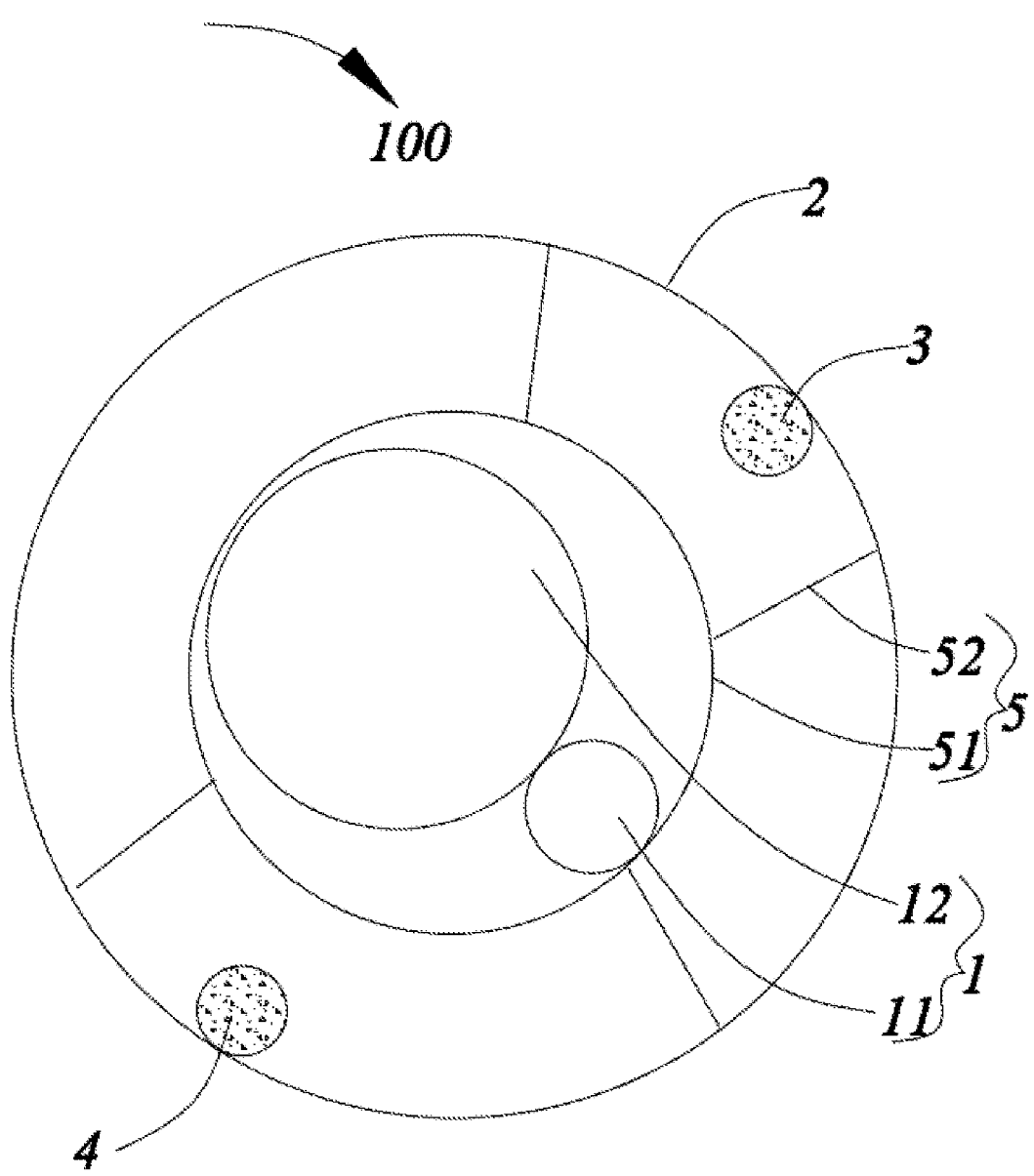
FIG. 1 is a schematic radial sectional diagram of a heat
exchange tube assembly according to the present invention.
Figure 2:
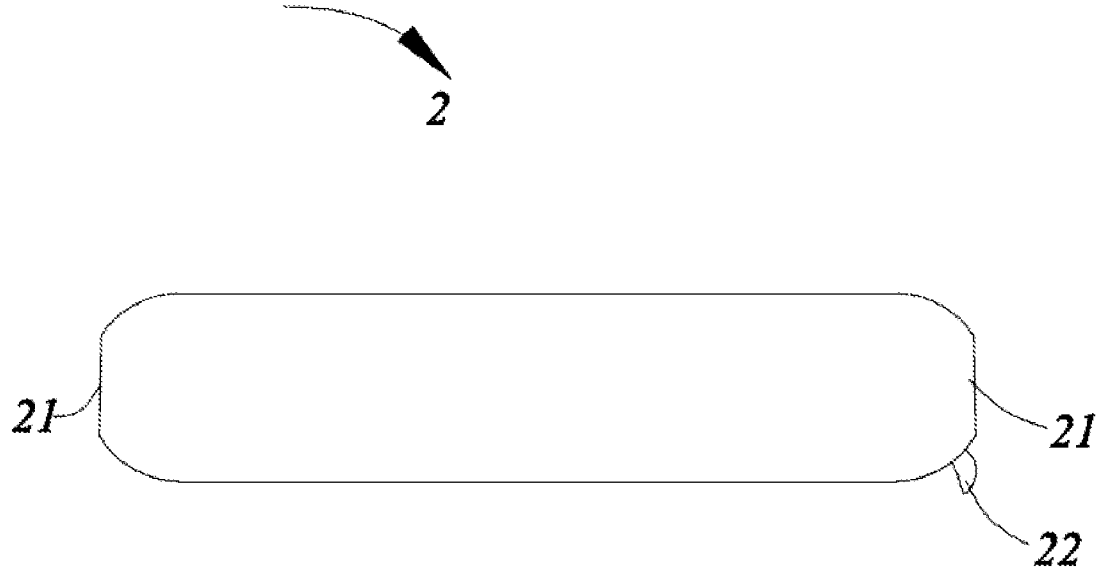
FIG. 2 is a schematic structural diagram of a vacuum tube
in the heat exchange tube assembly shown in FIG. 1.
Figure 3:
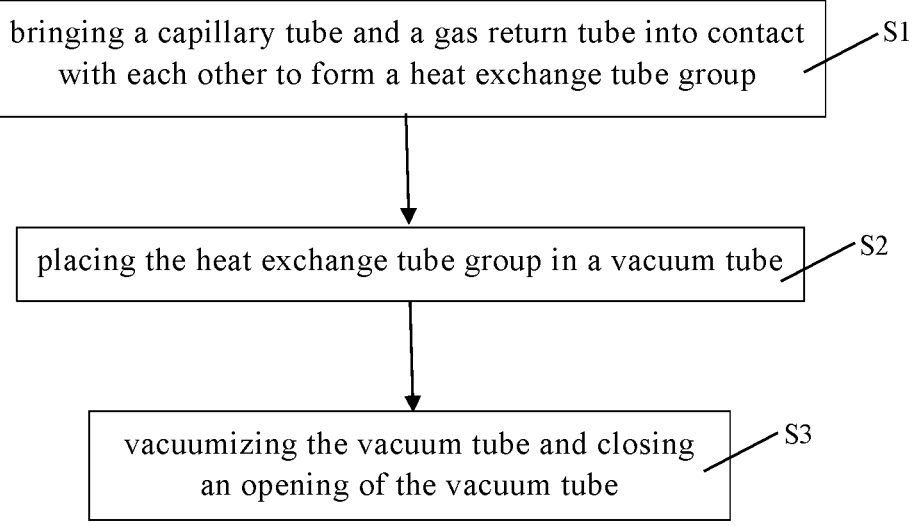
FIG. 3 is a flow chart of a fabrication method of a heat
exchange tube assembly according to the present invention.

Hereinafter, the present invention will be described in
detail in conjunction with embodiments shown in the
accompanying drawings, and FIGS. 1 to 3 show preferred
embodiments of the present invention. It should be noted
that these embodiments have no limitations on the present
invention, and equivalent transformations or replacement of
function, method or structure made by persons skilled in the
art according to these embodiments fall within the protection
scope of the present invention.

Referring to FIG. 1, the present invention provides a heat
exchange tube assembly 100, including a heat exchange tube
group 1 and a vacuum tube 2 with which a periphery of the
heat exchange tube group 1 is sleeved, the vacuum tube 2
having a heat preservation and insulation effect.

The heat exchange tube group 1 includes a capillary tube
11 and a gas return tube 12 which come into contact with
each other; in an operation process of a refrigerating system
with the heat exchange tube assembly 100, refrigerant liquid
in the capillary tube 11 and the gas return tube 12 flow
oppositely, and the capillary tube 11 exchanges heat with the
gas return tube 12 during throttling, such that the liquid
entering an evaporator is supercooled, harmful flash gas
possibly generated during throttling is reduced, a specific
volume of the flash gas in a refrigerant is reduced, and
density and a throttling amount of the liquid refrigerant are
increased, thereby increasing a unit refrigerating amount to
a certain extent, that is, improving a refrigerating efficiency of the refrigerating system; when the capillary tube 11 is
supercooled, low-pressure steam in the gas return tube 12 is
also superheated, thus avoiding that a liquid impact accident
of a compressor is caused due to over humid steam possibly
existing in return gas entering the compressor.

In the present embodiment, the capillary tube 11 and the
gas return tube 12 are arranged side by side, but the present
invention is not limited thereto; it may be understood that,
in other embodiments, the capillary tube 11 may be spirally
wound around a periphery of the gas return tube 12.

In one embodiment, the capillary tube 11 and the gas
return tube 12 are welded together by solder, such that
connection is stable and a cost is low. Certainly, the present
invention is not limited thereto, and in other embodiments,
the capillary tube 11 and the gas return tube 12 may be fixed
together side by side by winding aluminum foil.

In the present invention, by sleeving the periphery of the
heat exchange tube group 1 with the vacuum tube 2 having
a heat preservation and insulation performance, heat transfer
paths, such as heat conduction, heat convection, or the like,
can be eliminated, and only heat radiation is left; that is, the
vacuum tube 2 can greatly improve a heat insulation effect
of the heat exchange tube assembly 100, thus reducing an
influence of the heat exchange tube assembly 100 on a
temperature in a refrigerating compartment, and reducing a
heat load of a refrigerator; meanwhile, the heat transfer
paths, such as heat conduction, heat convection, or the like,
are eliminated, such that the capillary tube 11 and the gas
return tube 12 can be subjected to sufficient heat exchange,
thereby reducing lengths of the capillary tube 11 and the gas
return tube 12 to achieve a purpose of saving the cost.

The vacuum tube 2 is in a closed state, and a vacuum
degree in the vacuum tube 2 is less than 1 pa, thus guaran-
teeing the heat preservation and insulation performance of
the vacuum tube 2.

Referring to FIG. 2, specifically, end openings 21 are
provided at two opposite ends of the vacuum tube 2 along an
axial direction of the vacuum tube 2, and after the heat
exchange tube group 1 passes through the vacuum tube 2
from the end openings 21, the end openings 21 are closed by
welding with solder. It may be appreciated that after the heat
exchange tube group 1 passes through the vacuum tube 2,
pipes for connecting the heat exchange tube group 1 with
other components in the refrigerating system extend from
the end openings 21.

Meanwhile, the vacuum tube 2 is further provided with a
vacuumizing opening 22 for vacuumizing, and after the end
opening 21 is closed, the vacuumizing opening 22 is con-
nected to a vacuum pump to vacuumize the vacuum tube 2,
and after the vacuum degree of the vacuum tube 2 reaches
a preset vacuum degree, the vacuum pump is stopped and
the vacuumizing opening 22 is closed.

Specifically, the vacuumizing opening 22 may be closed
by welding with solder, or a one-way valve may be mounted
at the vacuumizing opening 22, and the vacuumizing open-
ing 22 is closed by the one-way valve, such that the vacuum
tube 2 is in the closed state.

Further, the heat exchange tube assembly 100 further
includes a getter 3 provided in the vacuum tube 2 for
absorbing gas leaked into the vacuum tube 2, so as to avoid
that the gas leaked into the vacuum tube 2 affects the
vacuum degree in the vacuum tube 2 after a long time, that
is, to keep the vacuum degree in the vacuum tube 2, thereby
keeping the heat preservation and insulation performance of
the vacuum tube 2.

In one embodiment, the getter 3 is made of a barium-lithium alloy material with a good gas absorbing effect; certainly, the present invention is not limited thereto.

Further, the heat exchange tube assembly 100 further includes a drying agent 4 provided inside the vacuum tube 2 to maintain dryness inside the vacuum tube 2, which is beneficial to keeping the vacuum degree in the vacuum tube 2, thereby keeping the heat preservation and insulation performance of the vacuum tube 2.

In one embodiment, the drying agent 4 is made of calcium oxide, and certainly, the present invention is not limited thereto.

It may be appreciated that the getter 3 and/or the drying agent 4 are/is placed in the vacuum tube 2 before the end opening 21 is closed.

Further, the heat exchange tube assembly 100 further includes a support 5 for fixing the heat exchange tube group 1 in the vacuum tube 2, and the support 5 is supported between the heat exchange tube group 1 and an inner wall of the vacuum tube 2, so as to prevent the heat exchange tube group 1 from contacting the inner wall of the vacuum tube 2, thereby preventing solid phase heat conduction caused by contact between the heat exchange tube group 1 and the inner wall of the vacuum tube 2, further improving the heat insulation effect of the heat exchange tube assembly 100, and enabling sufficient heat exchange to be performed between the capillary tube 11 and the gas return tube 12.

In one embodiment, the support 5 includes a support sleeve 51 with which the periphery of the heat exchange tube group 1 is sleeved, and a plurality of support sheets 52 located on a side of the support sleeve 51 facing the inner wall of the vacuum tube 2, and after the heat exchange tube group 1 is fixed in the vacuum tube 2 by the support 5, one end of each of the plurality of support sheets 52 apart from the support sleeve 51 abuts against the inner wall of the vacuum tube 2 to fix the heat exchange tube group 1, and a gap is formed between the heat exchange tube group 1 and the inner wall of the vacuum tube 2; that is, the heat exchange tube group 1 and the inner wall of the vacuum tube 2 are in a non-contact state.

Certainly, the present invention is not limited thereto; it may be understood that all structures of the support 5 which can fix the heat exchange tube group 1 in the vacuum tube 2 and allow the gap to be formed between the heat exchange tube group 1 and the inner wall of the vacuum tube 2 are within the protection scope of the present invention.

Specifically, the support sleeve 51 is cylindrical, and an inner diameter of the support sleeve 51 is the same as a longest diameter of the heat exchange tube group 1, such that the heat exchange tube group 1 can be stably fixed in the support sleeve 51 without shaking after the heat exchange tube group 1 is sleeved with the support sleeve 51.

Further, an outer diameter of the support sleeve 51 is less than an inner diameter of the vacuum tube 2, such that the support sleeve 51 can be clamped into the vacuum tube 2 easily.

Further, at least two supports 5 are provided and distributed in the vacuum tube 2 at intervals along the axial direction of the vacuum tube 2, so as to fix the heat exchange tube group 1 in a segmented manner, thereby further reducing solid-phase heat conduction and reducing the cost.

Further, referring to FIG. 3, the present invention further provides a fabrication method of a heat exchange tube assembly 100, including the following steps:

S1: bringing a capillary tube 11 and a gas return tube 12 into contact with each other to form a heat exchange tube group 1;

S2: placing the heat exchange tube group 1 in a vacuum tube 2; and

S3: vacuumizing the vacuum tube 2 and closing an opening of the vacuum tube 2.

In one embodiment, S1 specifically includes: welding the capillary tube 11 and the gas return tube 12 together side by side by solder to form the heat exchange tube group 1. The capillary tube 11 comes into contact with the gas return tube 12, such that when a refrigerating system with the heat exchange tube assembly 100 runs, the capillary tube 11 and the gas return tube 12 can exchange heat, and liquid entering an evaporator is supercooled, thereby increasing a unit refrigerating amount, that is, improving a refrigerating efficiency of the refrigerating system; meanwhile, low-pressure steam in the gas return tube 12 is also superheated, thus avoiding that a liquid impact accident of a compressor is caused due to over humid steam possibly existing in return gas entering the compressor.

Further, between S1 and S2, the fabrication method further includes the following steps: sleeving a periphery of the heat exchange tube group 1 with a support 5 or placing the support 5 in the vacuum tube 2; that is, sleeving the periphery of the heat exchange tube group 1 with the support 5, and then mounting the heat exchange tube group 1 sleeved with the support 5 in the vacuum tube 2, or pre-placing the support 5 in the vacuum tube 2, and then passing the heat exchange tube group 1 through the support 5, such that on the one hand, the support 5 fixes the heat exchange tube group 1 in the vacuum tube 2; on the other hand, after the heat exchange tube group 1 is mounted in the vacuum tube 2, the support 5 can prevent the heat exchange tube group 1 from contacting an inner wall of the vacuum tube 2, thereby preventing solid phase heat conduction caused by contact between the heat exchange tube group 1 and the inner wall of the vacuum tube 2, further improving the heat insulation effect of the heat exchange tube assembly 100, and enabling sufficient heat exchange to be performed between the capillary tube 11 and the gas return tube 12.

Further, between S2 and S3, the fabrication method further includes the following step: placing a getter 3 and/or a drying agent 4 in the vacuum tube 2.

Specifically, after an end opening 21 at one end is closed, the getter 3 and/or the drying agent 4 are/is placed into the vacuum tube 2 from an end opening 21 at the other end.

Further, step S3 specifically includes:

S31: closing the end openings 21 at the two ends of the vacuum tube 2;

S32: connecting a vacuumizing opening 22 for vacuumizing on the vacuum tube 2 to a vacuum pump;

S33: heating the vacuum tube 2 and starting the vacuum pump to realize a preset vacuum degree; and S34: closing the vacuumizing opening 22.

Specifically, a heating temperature of the vacuum tube 2 in S33 is not lower than 70° C., and further, the heating temperature of the vacuum tube 2 is not lower than 100° C., such that moisture/gas absorbed by the vacuum tube 2 and/or the capillary tube 11 and/or the gas return tube 12 is changed into gas, which is beneficial to subsequently maintaining the vacuum degree in the vacuum tube 2.

Specifically, the preset vacuum degree in S33 is 1 pa, so as to guarantee a final heat preservation and insulation performance of the vacuum tube 2.

Specifically, S34 includes: closing the vacuumizing opening 22 by welding with solder; or mounting a one-way valve at the vacuumizing opening 22, and closing the vacuumizing opening 22 by the one-way valve, such that the vacuum tube 2 is in a closed state.

Further, the present invention further provides a refrigerator, including a heat exchange tube assembly 100, wherein a structure or a fabrication method of the heat exchange tube assembly 100 is described above, and is not repeated herein.

In conclusion, in the heat exchange tube assembly 100 according to the present invention, by sleeving the periphery of the heat exchange tube group 1 with the vacuum tube 2 having the heat preservation and insulation performance, heat transfer paths, such as heat conduction, heat convection, or the like, can be eliminated, and only heat radiation is left; that is, the vacuum tube 2 can greatly improve the heat insulation effect of the heat exchange tube assembly 100, thus reducing an influence of the heat exchange tube assembly 100 on the temperature in the refrigerating compartment, and reducing a heat load of the refrigerator; meanwhile, the heat transfer paths, such as heat conduction, heat convection, or the like, are eliminated, such that the capillary tube 11 and the gas return tube 12 can be subjected to sufficient heat exchange, thereby reducing lengths of the capillary tube 11 and the gas return tube 12 to achieve a purpose of saving the cost.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present invention, and is not intended to limit the protection scope of the present invention. Equivalent embodiments or modifications made within the spirit of the present invention shall fall within the protection scope of the present invention.

The invention claimed is:

1. A heat exchange tube assembly, comprising a heat exchange tube group, the heat exchange tube group comprising a capillary tube and a gas return tube which come into contact with each other, wherein the heat exchange tube assembly further comprises a vacuum tube with which a periphery of the heat exchange tube group is sleeved, further comprising a support for fixing the heat exchange tube group in the vacuum tube, the support comprises a support sleeve with which the periphery of the heat exchange tube group is sleeved and a plurality of support sheets located on a side of the support sleeve facing an inner wall of the vacuum tube, wherein a section of the support sleeve is circular, and an outer diameter of the support sleeve is less than an inner diameter of the vacuum tube, wherein at least two supports are provided and distributed in the vacuum tube at intervals along an axial direction of the vacuum tube.

2. The heat exchange tube assembly according to claim 1, further comprising a getter and/or a drying agent provided in the vacuum tube.

3. The heat exchange tube assembly according to claim 1, wherein the gas return tube and the capillary tube are arranged side by side.

4. A refrigerator, comprising the heat exchange tube assembly according to claim 1.

* * * * *